(12) United States Patent
de Waal et al.

(10) Patent No.: US 7,766,744 B2
(45) Date of Patent: Aug. 3, 2010

(54) METHOD AND APPARATUS FOR PROVIDING CUSTOMIZABLE PLAYER BONUSES

(75) Inventors: Daniel J. de Waal, Las Vegas, NV (US); Bryan Bullard, Las Vegas, NV (US); William C. Little, Las Vegas, NV (US)

(73) Assignees: IGT, Reno, NV (US); Western Money Systems, Sparks, NV (US)

( * ) Notice: Subject to any disclaimer, the term of this patent is extended or adjusted under 35 U.S.C. 154(b) by 1091 days.

(21) Appl. No.: 10/663,950

(22) Filed: Sep. 16, 2003

(65) Prior Publication Data

US 2005/0037841 A1  Feb. 17, 2005

Related U.S. Application Data

(60) Provisional application No. 60/411,487, filed on Sep. 17, 2002, provisional application No. 60/502,124, filed on Sep. 11, 2003.

(51) Int. Cl.
*A63F 9/24* (2006.01)
(52) U.S. Cl. .......................................... 463/27; 463/26
(58) Field of Classification Search .................... 463/23, 463/25, 26, 27, 28, 42
See application file for complete search history.

(56) References Cited

U.S. PATENT DOCUMENTS

| | | |
|---|---|---|
| 4,283,709 A | 8/1981 | Lucero et al. |
| 4,636,951 A | 1/1987 | Harlick |
| 4,689,742 A | 8/1987 | Troy et al. |
| 4,764,666 A | 8/1988 | Bergeron |
| 4,835,624 A | 5/1989 | Black et al. |
| 4,858,123 A | 8/1989 | Alexoff et al. |
| 4,880,237 A | 11/1989 | Kishishita |
| 5,007,627 A | 4/1991 | Giannetti et al. |
| 5,179,517 A | 1/1993 | Sarbin et al. |
| 5,231,568 A | 7/1993 | Cohen et al. |
| 5,239,165 A | 8/1993 | Novak |
| 5,265,874 A | 11/1993 | Dickinson et al. |
| 5,290,033 A | 3/1994 | Bittner et al. |
| 5,321,241 A | 6/1994 | Craine |
| 5,321,568 A | 6/1994 | Hatam-Tabrizi et al. |
| 5,350,168 A | 9/1994 | Sheridan |
| 5,371,345 A | 12/1994 | LeStrange et al. |
| 5,420,406 A | 5/1995 | Izawa et al. |
| 5,429,361 A | 7/1995 | Raven et al. |
| 5,470,079 A | 11/1995 | LeStrange et al. |
| 5,472,194 A * | 12/1995 | Breeding et al. .............. 463/27 |
| 5,475,205 A | 12/1995 | Behm et al. |

(Continued)

FOREIGN PATENT DOCUMENTS

DE          3406058          8/1985

(Continued)

*Primary Examiner*—Peter DungBa Vo
*Assistant Examiner*—Omkar Deodhar
(74) *Attorney, Agent, or Firm*—Weaver Austin Villeneuve & Sampson LLP

(57) ABSTRACT

A method and apparatus for tracking play of a game is disclosed. A first set of game outcomes from play of a game associated with a first enterprise is received and stored in a database. A second set of game outcomes from play of a second game associated with a second enterprise independent from the first enterprise is received and stored in the database.

44 Claims, 9 Drawing Sheets

U.S. PATENT DOCUMENTS

| | | | |
|---|---|---|---|
| 5,557,086 A | | 9/1996 | Schulze et al. |
| 5,564,700 A | * | 10/1996 | Celona ............... 463/27 |
| 5,577,959 A | | 11/1996 | Takemoto et al. |
| 5,580,311 A | | 12/1996 | Haste, III |
| 5,595,538 A | | 1/1997 | Haste, III |
| 5,611,730 A | * | 3/1997 | Weiss ............... 463/20 |
| 5,613,912 A | * | 3/1997 | Slater ............... 463/25 |
| 5,626,341 A | * | 5/1997 | Jones et al. ............... 273/292 |
| 5,627,356 A | | 5/1997 | Takemoto et al. |
| 5,639,088 A | * | 6/1997 | Schneider et al. ........ 273/138.2 |
| 5,655,961 A | * | 8/1997 | Acres et al. ............... 463/27 |
| 5,692,743 A | | 12/1997 | Yano et al. |
| 5,709,603 A | | 1/1998 | Kaye |
| 5,761,647 A | * | 6/1998 | Boushy ............... 705/10 |
| 5,772,510 A | | 6/1998 | Roberts |
| 5,791,990 A | | 8/1998 | Schroeder et al. |
| 5,818,026 A | | 10/1998 | Melling et al. |
| 5,833,540 A | * | 11/1998 | Miodunski et al. ............ 463/42 |
| 5,871,398 A | | 2/1999 | Schneier et al. |
| 5,876,284 A | * | 3/1999 | Acres et al. ............... 463/25 |
| 5,901,951 A | | 5/1999 | Yamaguchi |
| 5,915,588 A | | 6/1999 | Stoken et al. |
| 6,001,016 A | * | 12/1999 | Walker et al. ............... 463/42 |
| 6,012,832 A | | 1/2000 | Saunders et al. |
| 6,012,982 A | * | 1/2000 | Piechowiak et al. ............ 463/16 |
| 6,014,594 A | | 1/2000 | Heidel et al. |
| 6,024,640 A | | 2/2000 | Walker et al. |
| 6,048,269 A | | 4/2000 | Burns et al. |
| 6,048,271 A | | 4/2000 | Barcelou |
| 6,056,289 A | | 5/2000 | Clapper, Jr. |
| 6,077,162 A | * | 6/2000 | Weiss ............... 463/26 |
| 6,098,837 A | | 8/2000 | Izawa et al. |
| 6,110,043 A | * | 8/2000 | Olsen ............... 463/27 |
| 6,110,044 A | | 8/2000 | Stern |
| 6,113,492 A | | 9/2000 | Walker et al. |
| 6,128,550 A | | 10/2000 | Heidel et al. |
| 6,146,273 A | * | 11/2000 | Olsen ............... 463/27 |
| 6,190,256 B1 | | 2/2001 | Walker et al. |
| 6,206,782 B1 | * | 3/2001 | Walker et al. ............... 463/25 |
| 6,210,276 B1 | * | 4/2001 | Mullins ............... 463/27 |
| 6,227,972 B1 | | 5/2001 | Walker et al. |
| 6,231,445 B1 | | 5/2001 | Acres |
| 6,241,118 B1 | | 6/2001 | Tramontina |
| 6,253,119 B1 | | 6/2001 | Dabrowski |
| 6,270,406 B1 | | 8/2001 | Sultan |
| 6,302,793 B1 | * | 10/2001 | Fertitta et al. ............... 463/25 |
| 6,312,332 B1 | * | 11/2001 | Walker et al. ............... 463/23 |
| 6,319,125 B1 | * | 11/2001 | Acres ............... 463/25 |
| 6,340,331 B1 | | 1/2002 | Saunders et al. |
| 6,346,044 B1 | * | 2/2002 | McCrea, Jr. ............... 463/27 |
| 6,347,794 B2 | | 2/2002 | Scrymgeour et al. |
| 6,503,146 B2 | * | 1/2003 | Walker et al. ............... 463/25 |
| 6,527,638 B1 | | 3/2003 | Walker et al. |
| 6,599,193 B2 | * | 7/2003 | Baerlocher et al. ............ 463/27 |
| 6,656,048 B2 | * | 12/2003 | Olsen ............... 463/25 |
| 6,692,353 B2 | * | 2/2004 | Walker et al. ............... 463/16 |
| 6,773,345 B2 | * | 8/2004 | Walker et al. ............... 463/17 |
| 6,843,724 B2 | * | 1/2005 | Walker et al. ............... 463/25 |
| 6,866,586 B2 | * | 3/2005 | Oberberger et al. ............ 463/42 |
| 6,869,361 B2 | * | 3/2005 | Sharpless et al. ............ 463/25 |
| RE38,982 E | * | 2/2006 | Forte et al. ............... 463/12 |
| 7,025,674 B2 | * | 4/2006 | Adams et al. ............... 463/1 |
| 7,037,195 B2 | * | 5/2006 | Schneider et al. ............ 463/25 |
| 2004/0102243 A1 | * | 5/2004 | Olsen ............... 463/25 |

FOREIGN PATENT DOCUMENTS

| | | |
|---|---|---|
| WO | WO 94/16781 | 8/1994 |
| WO | WO 95/24689 | 9/1995 |
| WO | WO 98/59311 | 12/1998 |

* cited by examiner

METHOD AND APPARATUS FOR PROVIDING CUSTOMIZABLE PLAYER BONUSES

CROSS REFERENCE TO RELATED APPLICATIONS

This application claims benefit of U.S. Provisional Patent Application No. 60/411,487, entitled "METHOD AND APPARATUS FOR PROVIDING CUSTOMIZABLE PLAYER BONUSES," by Daniel J. de Waal, filed Sep. 17, 2002, which application is hereby incorporated by reference herein;

This application also claims benefit of U.S. Provisional Patent Application No. 60/502,124, entitled "CUSTOMER ACTIVITY TRACKING SYSTEM," by Daniel J. de Waal, filed Sep. 11, 2003, which application is hereby incorporated by reference herein.

BACKGROUND OF THE INVENTION

1. Field of the Invention

The present invention relates to systems and methods for monitoring game play and for providing bonuses for such game play, and in particular to a method and system for providing customizable player bonuses across enterprises.

2. Description of the Related Art

Recent years have seen a rapid expansion of the gaming industry. The income derived from such games is collected at live gaming tables as well as gaming devices like slot machines and video poker games.

To attract customers, larger goods and/or service providers (e.g. gaming establishments) implement programs in which players can obtain bonuses and other benefits each time they play machines in that particular establishment or affiliates within the same enterprise. Such programs (sometimes termed "frequent player," "loyalty" or "bonus" programs) may also permit the goods/service provider to monitor customer activity. This permits the service/goods provider to customize the services and goods presented to each customer or group of customers so that each customer's needs are better met. In many instances, the customer agrees to permit the collection of such information in exchange for lower prices, a bonus program, or other incentives offered by the service/goods provider.

In such circumstances, it is important to include some medium or means for keeping track of each customer's activity. This can be accomplished with a secure dedicated network enterprise-interconnected computers or similar devices at the point of sale/service. Each device collects information regarding the sale and provide that information to a central database, where the data can be stored and analyzed.

The problem with this solution is that it requires a substantial investment in the infrastructure (the interconnected network) itself. This substantial investment is typically greater than can be provided by smaller goods/service providers.

Another difficulty with this solution is that it limits bonus program participation to player activity within each enterprise. In other words, player activity in one gaming establishment does not earn bonus awards in different enterprise unaffiliated with the first gaming establishment.

Another difficulty with typical bonus programs is that they are not easily customizable to create a wide variety of bonus award qualifications. In particular, there is a need to define layered promotional programs with multiple promotional levels.

Yet another difficulty with typical promotional programs is that they qualify participants based on achieving certain results within a given number of attempts, rather than a predefined period of time. For example, existing promotional systems typically provide the player with a bonus if they achieve certain outcome combinations within a specified number of hands played. Although this is thought to allow the casino to more accurately determine the odds of winning so that precise payback margins be defined, such systems do not permit more precise payback margins to be defined, since the availability of the bonus can change the customer's game play and affect the payback margins. For example, if a substantial bonus is offered for four-of-a-kind hands, players of a draw poker machine may make game play decisions they would not otherwise make in order to achieve a four-of-a-kind result. Awarding bonuses based on the results within a number of hands played also does not encourage players to play at a greater rate. What is needed is a system that permits the definition of promotional bonuses that are based on a predetermined time period, so that players are encouraged to play more.

Progressive bonus programs, in which a jackpot is incrementally increased in amount as players play the game, are also known. One difficulty with such programs is that they increment the progressive bonus based on the handle (coin-in activity) instead of game outcomes.

SUMMARY OF THE INVENTION

To address the requirements described above, the present invention discloses a method and apparatus for tracking play of a game. The method comprises the steps of receiving a first set of game outcomes from play of a game associated with a first enterprise, storing the first set of game data in a database, receiving a second set of game outcomes from play of a second game associated with a second enterprise independent from the first enterprise, and storing the second set of game outcomes in the database. The apparatus comprises hardware and software modules and other means for performing the above operations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
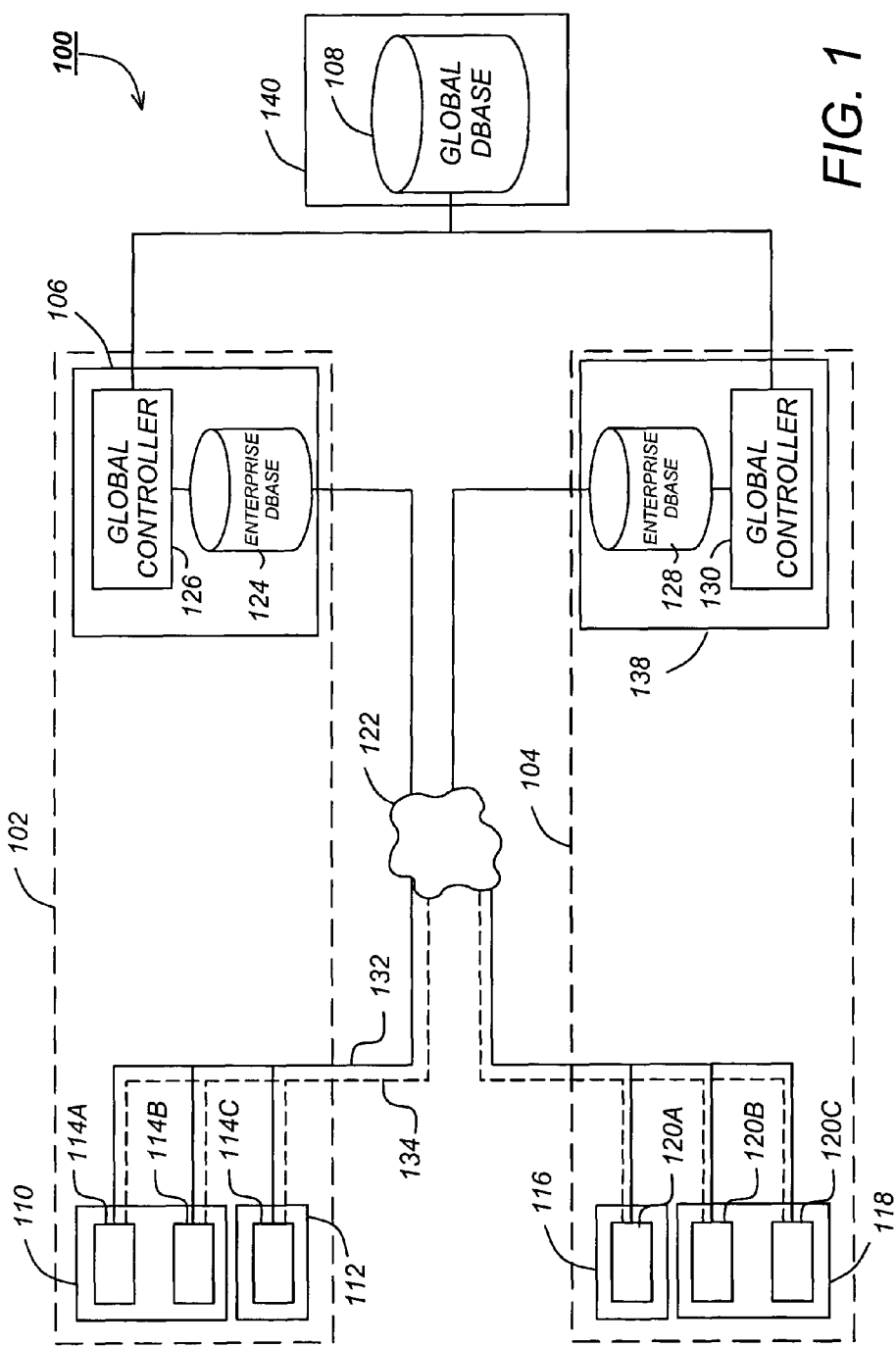
FIG. 1 is a diagram representing an overview of the customizable player bonus system.

In the following description, reference is made to the accompanying drawings which form a part hereof, and which is shown, by way of illustration, several embodiments of the present invention. It is understood that other embodiments may be utilized and structural changes may be made without departing from the scope of the present invention.

I. Overview

The present invention discloses a multi-property inter-enterprise player tracking system. The tracking system is especially suitable for participation by enterprises that are incapable or unwilling to invest in a dedicated enterprise specific on-line gaming system, and allow such smaller enterprises to offer bonus awards programs comparable to those offered in larger casinos.

Staff members use a simple touch screen interface to enroll customers, define promotions, track items or events, and redeem and account for rewards. Hardware interfacing with gaming machines allow players to log in with a unique number and have their play monitored and rewarded according to user-definable promotions. Promotional participation can also be entered manually through a touch screen interface if the qualifying activity (e.g. playing live games or making purchases) are met.

In one embodiment, gaming operators enroll customers and issue them member cards which include a unique customer number and a security number. The member card can include the information in printed form (e.g. in optically read codes), magnetically coded form, or stored in a smartcard or similar device. Customers use this issued card for all incentive reward programs at all participating locations of the enterprise issuing the card. Cashiers are issued similar coded cards to be scanned (or numbers entered on a keypad) before each manual entry of promotion participation or purchase. Because the cashiers and not the customers enter the appropriate information, accountability is assured.

The operator determines tracked gaming outcome combinations promotional items, earning percentages, reward units, and how rewards are redeemed. The operator may also generate comprehensive reports which detail customer rewards in conjunction with stored data such as final and intermediate gaming outcomes, handle, spending frequency, and cashiers on duty. This can be accomplished by storing all outcomes in the database for later processing to determine qualifying outcomes, or by processing outcomes in advance and storing only qualifying outcomes.

A. Enrollment

The enterprise provides customers with a sign-up form and the member card. In one embodiment, the customer card includes an optical bar code that is printed on the sign-up form as well as the card. The customer can use the member card to allow a purchase or other activity tracked and begin earning bonuses. In a purchase context, the cashier need only scan the bar code on the member card. This action opens a screen interface on the cashier's computer. Using this interface, the cashier can opt to enter the customer's name and address information or enter promotional activity, such as a purchase.

Operators can enter member information at a later time by scanning the bar code on the sign up form, which opens the customer account, and then entering the name and address information. In this way, cashiers are not burdened by data entry duties.

B. Activities

Gaming activity on electronic gaming machines related to defined promotions is tracked automatically when the player logs into the machine using the unique member number printed on the card, by swiping the card, by use of a biometric finger/thumb pad on the gaming machine, or other means. Thus, no cashier activity is required. Tracked gaming activity, including winning and losing outcomes, is tracked and updated. The data may be transmitted and the database is updated as soon as it occurs, or may be temporarily stored and batched to the centralized database.

When a customer meets a non-gaming promotional requirement such as a purchase, or a gaming related promotion not tracked by the gaming machine, the cashier first enters a unique cashier number (e.g. an employee number), and enters the quantity or dollar amount associated with the promotional requirement. When the transaction is complete, two identical receipts are printed, showing the rewards earned during the transaction along with all promotional balances. The receipt also shows the location, date, time, employee number, and customer number. In one embodiment, the customer number is not the bar code printed on the customer card, but a unique number identifying the customer in the database. The cashier retains one receipt and gives the duplicate receipt to the customer. Manual promotion entries can be updated as soon as they are entered, or temporarily stored and batched to the centralized database.

In one embodiment of the invention, customers are presented with a plurality of bonus programs, and the customer can select which of the bonus programs they would like to participate in. For example, a particular player may feel that four-of-a-kind is a lucky hand for them. If a bonus program awarding four-of-a-kind outcomes is defined and presented as one of the available bonus promotions, the customer can select this bonus program for participation.

C. Redemption

When a customer opts to redeem promotional rewards, they must present a member card and a verified photo identification to the cashier. Such verified photo identification includes, for example, a state-issued identification card, a driver's license, or a passport. The cashier first enters the unique cashier number and scans the customer card. The customer's name and other information is then presented to the cashier on a display. The cashier then verifies the customer's identity using the presented account information and the presented identification.

The cashier selects the redemption screen and is prompted to enter the customer security number, which is printed on the customer card. The customer security number is associated with a card bar code in the database, but is otherwise unrelated. Once the security number is entered, the cashier is presented with a screen showing all promotional balances. The cashier enters the number to be redeemed, presses the promotional balance to be deducted, and finishes the transaction. Two identical receipts are printed, showing the amount redeemed, remaining promotional balances, and a signature line, along with the location, date, time, employee number, and customer number. Before allowing the redemption to proceed further, the customer must sign the receipts. The duplicate receipt is then issued to the customer.

D. Account Management

In the event a customer loses a member card, a manager or administrator can look up their account using the customer's first or last name, customer number, phone number, or e-mail address. Once the manager verifies the customer identity against the account information, a new card can be issued to the customer. The issuance of a new card does not eliminate the promotional earnings of the customer. Instead, all promotional earnings remain intact.

In the event that an error occurs during manual promotional entry, a manager can adjust account balances, either by debiting from or adding to the balance.

II. Components

FIG. 1 is a diagram presenting an overview of the customizable player bonus system CPBS 100. The CPBS 100 includes a first enterprise 102 and a second enterprise 104, which communicate with a global database server 136. The first enterprise can include a first location 110 and a second location 112, with the first location 110 having a first enterprise first client subsystem 114A and a first enterprise second client subsystem 114B, and the second location 112 having a third first enterprise client subsystem 114C.

The client subsystems 114A-114C are communicatively coupled to a first enterprise server 106 via the Internet 122 or similar communication medium. Communications between the client subsystems 114A-114C and the first enterprise server can be facilitated, for example by a DSL or T1 link or a dial-up link 134.

The first enterprise server 106 comprises an enterprise database 124 for storing information received from the client subsystems 114A-114C, managing player IDs, and determining bonus payouts. A global controller 126 communicatively coupled to the enterprise database 124 interfaces with a global server 136 and transmits game play and bonus-qualifying related information to the global server for storage. The global controller 126 also accepts data from the global database server 136 and provides that information to the enterprise server 106. Typically, the global database is maintained by an enterprise organizationally distinct from the first enterprise 102 and the second enterprise 104.

Second enterprise server 104 also includes a second enterprise first location 116 and a second enterprise second location 118. In the illustrated embodiment the second enterprise first location 116 and second location 118 include second enterprise client servers 120A-120C. Information from the second enterprise client servers 102A-102C is transmitted to a second enterprise server 138, which includes a second enterprise database 128 and a global controller 130 analogous to the database 124 and controller 126 described above.

The first enterprise server 106 and the second enterprise server 138 are associated with different and independent enterprises. As will be discussed further below, this allows the CPBS 100 to be used by customers of different corporate entities, and allows bonus programs to be defined that cross enterprise boundaries. For example, a promotion created by a small business (e.g. a small gambling casino or retailer) can accept and award bonuses based on activity in another small, but unrelated business gaming activity or based on a large casino.

While FIG. 1 illustrates no direct connection between the client subsystems 114 and the global server 140, it is understood that the functionality of the enterprise server 106 can be included within the global server 140 and vice-versa if desired. Hence, the present invention can also be practiced with a direct connection between the client subsystems and the global server 114.

Figure 2:
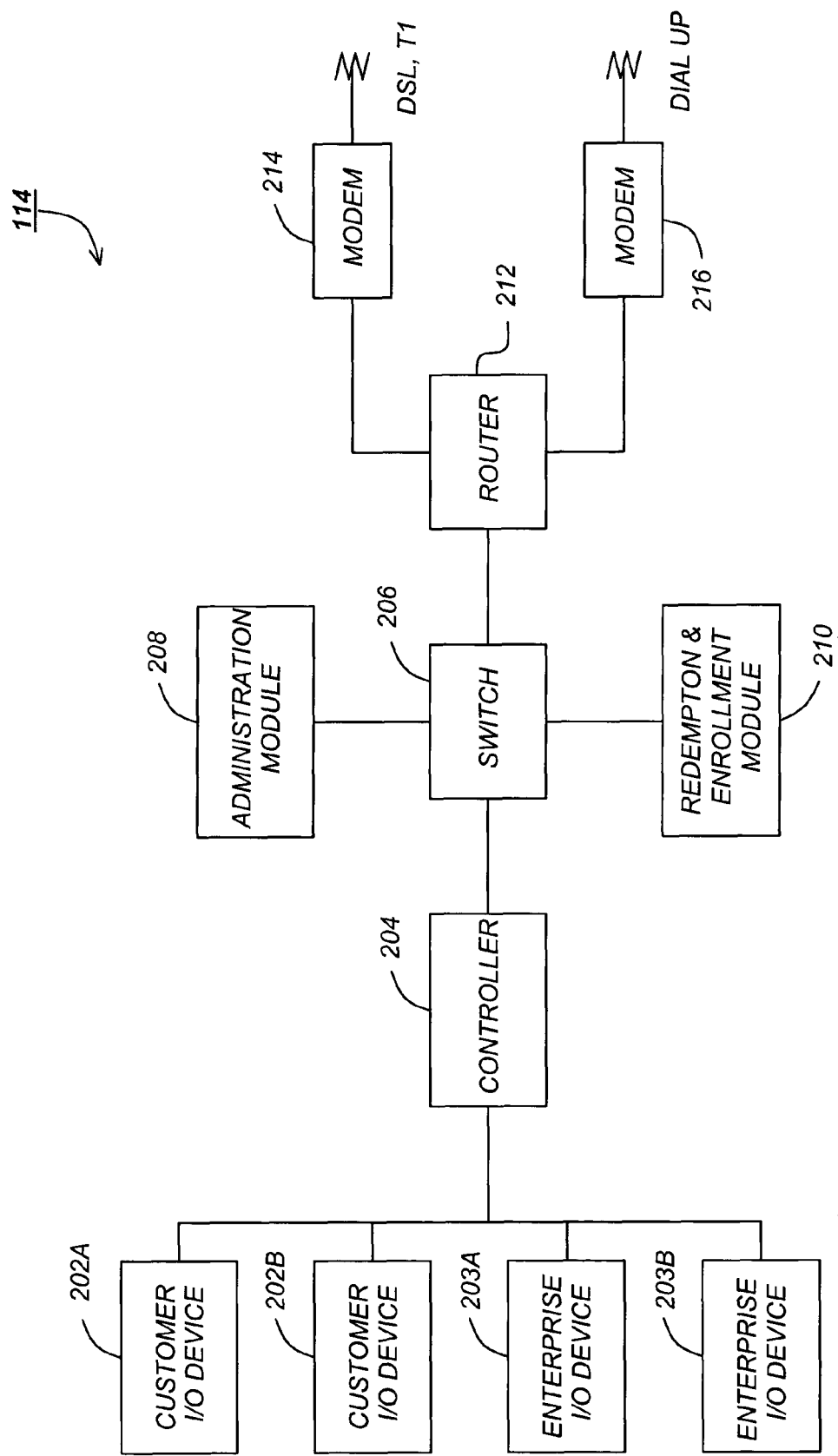
FIG. 2 is a diagram depicting one embodiment of a client subsystem.
Figure 3A:
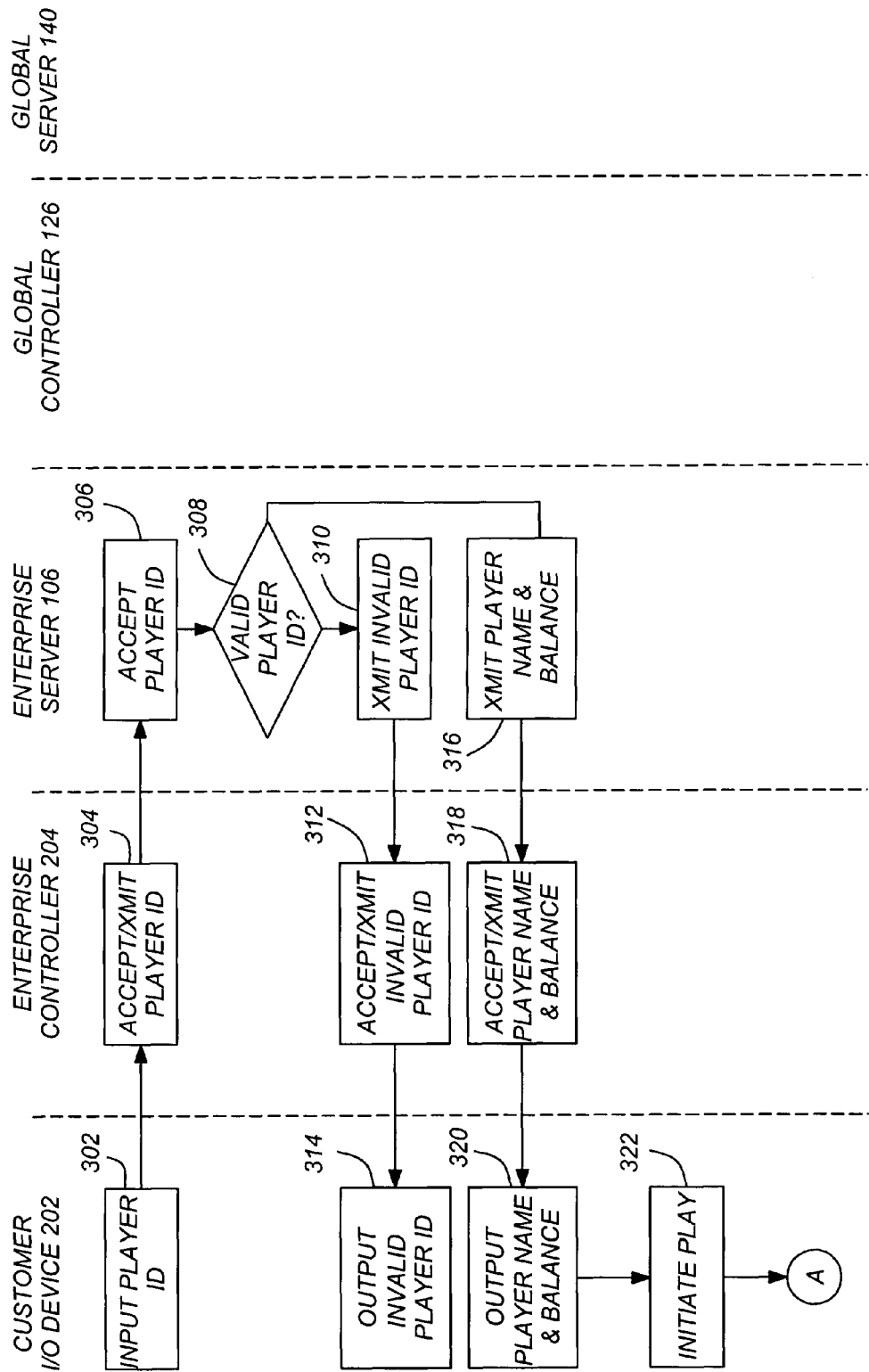
FIGS. 3A-3D are process flow diagrams presenting an overview of the use of the customizable player bonus system to store and use game information.
Figure 3B:
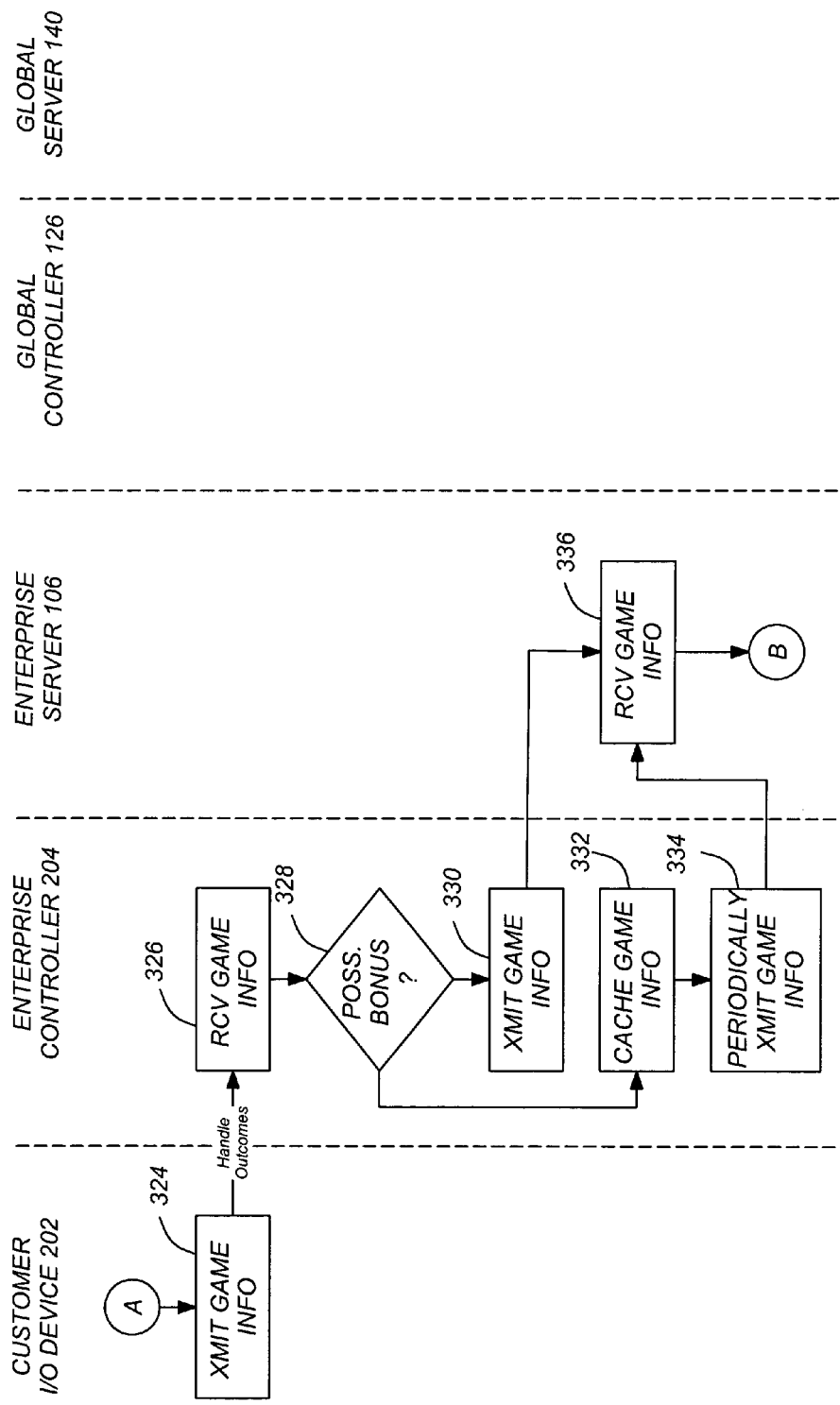
Figure 3C:
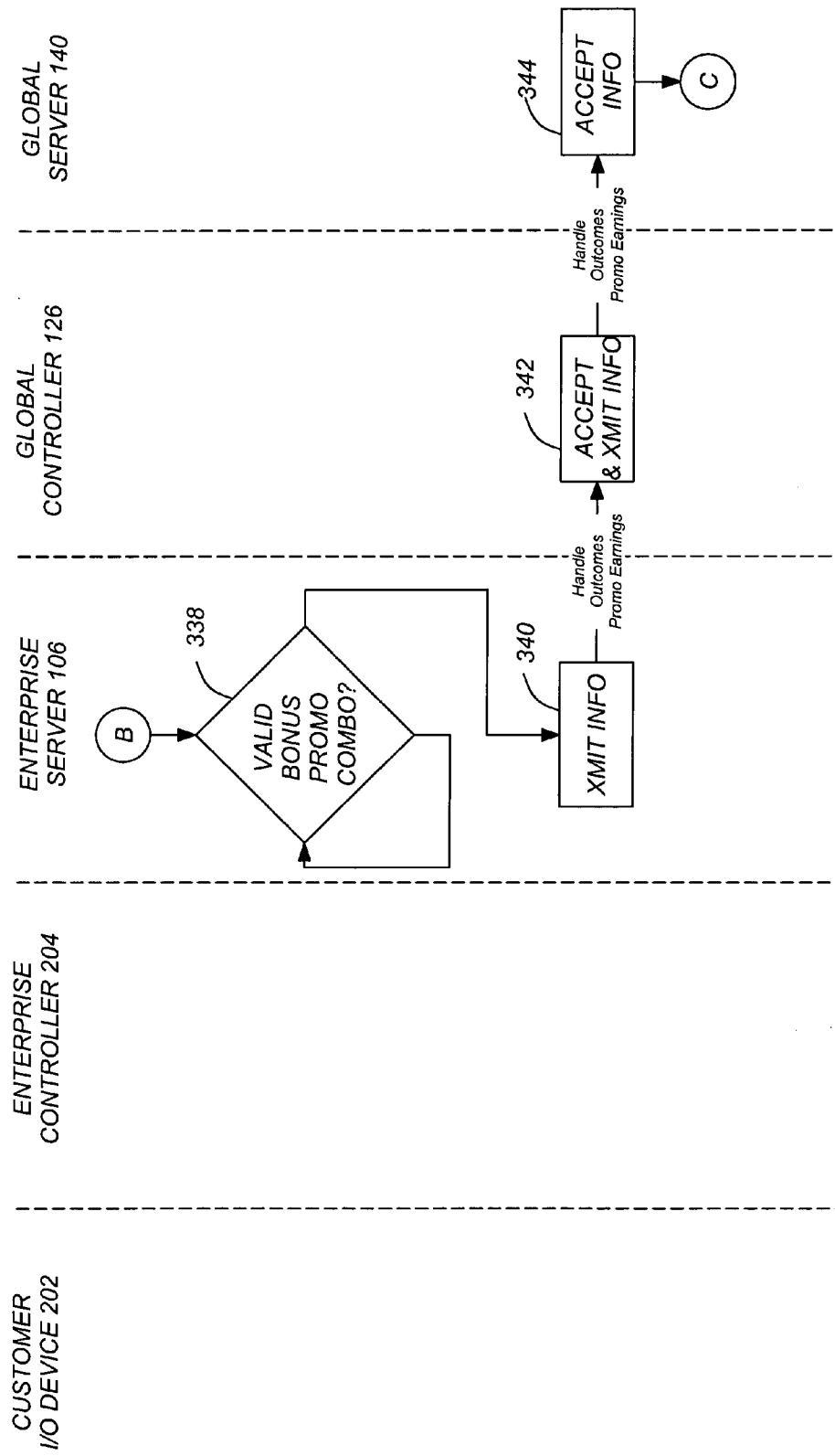
Figure 3D:
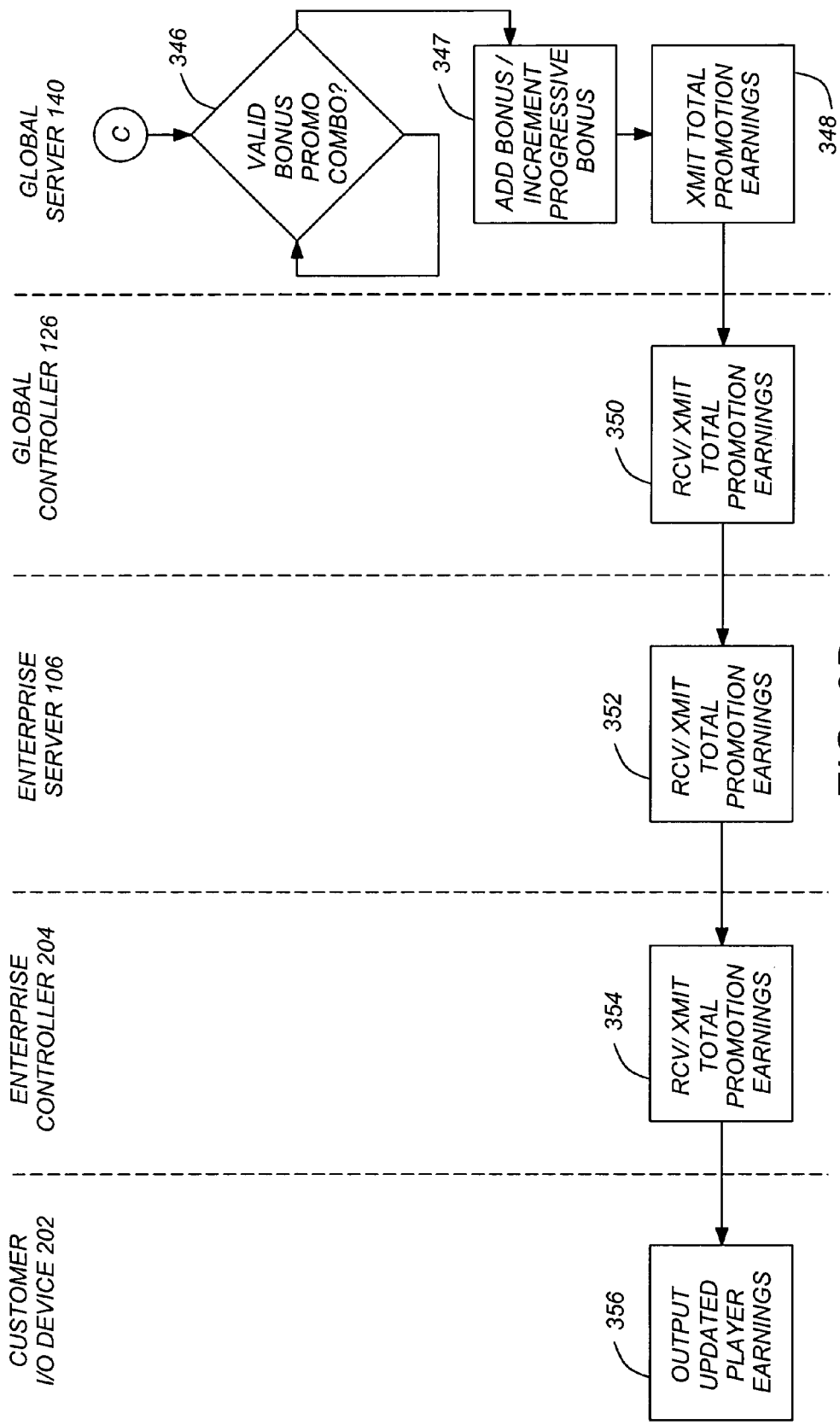

FIG. 2 is a diagram depicting one embodiment of the client subsystem. The client subsystem 114 includes customer I/O devices 202A-202B (hereinafter alternatively referred to as customer I/O device(s) 202). The customer I/O devices 202 potentially include gaming machines such as video poker, blackjack or slot machines, pinball machines or video games and/or point-of-sale consumer interface terminals. The client subsystem also potentially includes enterprise I/O devices 203A-203B (hereinafter alternatively referred to as enterprise I/O device(s) 203). The enterprise I/O devices 203 can include manual input terminals allowing enterprise employees or designees to enter live game play outcomes and similar information into the CPBS 100, at live gaming tables, as described in further detail below.

The manual entry terminals are configured to accept input player identification information and game outcomes from an operator (typically, the dealer). The manual entry terminals can have the same functionality as the REMs 210, or may be simplified versions of the REMs 210, allowing the entry of outcomes and customer data, but not allowing data to be changed or bonus awards to be redeemed.

In one embodiment, the manual entry of bonus-qualifying information such as winning outcomes is accomplished as follows. When the player sits at the live gaming table to play and achieves an outcome potentially qualifying the player for a bonus, the player provides player identification information to the dealer, and the dealer enters the outcome and the player identification information in the manual entry terminal. This can be implemented by use of a magnetic or pre-printed card storing player identification information, a smart card, or similar device.

For example, the customer can simply sit down at the gaming table and play as usual. When a potentially bonus-qualifying outcome is achieved (e.g. four of a kind), the player offers his/her card to the dealer, who uses the card to enter the player identification information and the game outcome into the manual entry terminal 214. Alternatively, user can present the card before game play begins. Using the manual input terminal, the dealer can read the card before game play begins, note bonus-qualifying outcomes as they occur.

The customer I/O devices 202 and enterprise I/O devices are communicatively coupled to a controller 204. In one embodiment, the controller 204 is a solid-state device having a program running in a flash programmable read only memory (PROM). The controller 204 monitors the transactions and outcomes on the gaming machines 202, buffers them, and transmits them to the enterprise server 106 via switch 208.

The client subsystems 114 also comprise a redemption and enrollment module (REM) 210 and an administration module 208. The redemption and enrollment module 210 is used enroll customers in the bonus program and to redeem bonus awards for cash or other compensation. Typically, the REM 210 is located convenient to the gaming machines 202, so that players are encouraged to enroll in the bonus program and redeem bonus awards. The REM 210 can be used to activate member accounts and to enter customer information; to track promotion incidents, outcomes, and spending; to redeem bonuses for goods and/or services; and to look up bonus balances and if necessary, adjust them. Although both enrollment and redemption functions are illustrated as being performed by the REM 210, these functions can occur in different modules, if desired. For example, while there might be several enrollment modules in a given location to encourage enrollment, for purposes of security, there might be a smaller number of redemption modules.

The administration module 208 is used to perform bonus award program management and administration. The administration module is typically located in a secure location, away from the gaming machines 202A. For example, the administration module 208 can be disposed in an office adjacent a small casino or in the corporate office of the enterprise. In one embodiment, the administration module 208 is accessed remotely through a standard Internet browser, and secured with secure socket layer (SSL) certificates.

The administration module 208 can be used to define enterprise users, including cashiers and authorized employees, and to issue IDs and passwords to those users. The administration module 208 is used to define qualifying outcomes, promotional rules such as bonus parameter sets (which define which outcomes result in bonus awards), promotional duration, promotional percentages and other factors. The administration module 208 can also be used to access reports regarding promotional activity from the database, and to download customer names and addresses from the enterprise database 124 or global database 108 for promotional purposes, including, for example, direct mailings.

The administration module 208 and the REM 210 are coupled to a router 212 via a switch 208. The switch selectably couples the controller 204, the administration module 208 or the REM 210 to the router 212 to transmit and receive information to and from the client subsystem 114. The router 210 selectively transmits and receives messages from the T1/DSL line or a dial-up interface with the public switched telephone network (PSTN) via dial-up modem 212.

In the preferred embodiment, the administration module 208 and the REM 210 are implemented by a personal computer having an Internet browser. In this preferred embodiment, the software implementing the functions performed by the administration module 208 and the REM 210 are performed by software resident in the enterprise server 106 and/or the global server 140. Hence, the user of the administrative module 208 and/or the REM 210 connect with the enterprise server and/or global server 140 via a secure link, and are presented with screen displays presenting appropriate input and command fields to the user. Data input and commands are provided by the user into the browser implemented in the administrative module 208 and the REM module 210 computers, and transmitted to the enterprise server 106 and/or the global server 140. The enterprise server 106 and global server 140 perform the functions required to store, retrieve, and manage information entered by the administration module 208 and REM 210 in their respective databases 124 and 108, and returns appropriate messages to the administration module 208 and REM 210.

The customer I/O devices 202 and enterprise I/O devices 203 are configured to communicate player identification information and game information to the controller 204. The game information can include handle (wagers) and/or gaming outcomes to the controller 204. Preferably, the gaming machines report not only winning outcomes, but losing outcomes as well. This allows bonuses to be awarded for losing outcomes as well as winning outcomes, or different combinations of both. The gaming machines 202 may also report intermediate outcomes (e.g. in a draw poker machine, the dealt hand), and a bonus award can be defined using this information as well.

III. Promotional Bonus Program Implementations

FIGS. 3A-3D is a process flow diagram presenting an overview of the use of the CPBS 100 to store game information and use the information to provide bonus awards.

Information such as the player ID is input into a customer I/O device 202, as shown in block 302. If desired, the entered information can include a password or other information to verify the identity of the user. The player ID is accepted in the enterprise controller 204 and transmitted to the enterprise server 106, which accepts and checks the ID to determine if the player ID is valid. This is shown in blocks 304-308.

As described above, the customer may also enter a password into the customer I/O device 202, and this information can be used to perform the operations depicted in block 308 to determine if the customer is currently registered and permitted to accrue bonus points. At the same time, bonus award systems can be implemented in which the possession of the customer card itself is deemed sufficient to earn and redeem awards. In this situation, the customer is responsible for assuring the security of their card.

If the entered player ID is an incorrect ID, an "invalid player ID" message is generated by the enterprise server 106 and transmitted to the customer I/O device 202 via the enterprise controller 204. This is depicted in blocks 310-314.

If the entered player ID is the correct ID, information is transmitted from the enterprise server 106 to the customer I/O device 202 via the enterprise controller 204. This information can include, for example, the player name and balance. This is shown in blocks 316-320.

Next, as shown in block, the customer initiates game play, as shown in block 322. This is accomplished in the usual way, that is, by selecting buttons or other user I/O devices on the gaming machine. Game information is transmitted from the customer I/O device 202 and received in the enterprise controller 204. This is shown in blocks 324-326. The game information can comprise handle (wagers), game play outcomes (including winning outcomes, losing outcomes, pushes, and intermediate outcomes).

In one embodiment of the present invention, the bonus program administrator can use the administration module 208 to define up to 99 outcomes that potentially qualify for a bonus award or incrementing a bonus award (a "qualifying outcome"). Such outcomes ordinarily should be immediately to the enterprise server, while other outcomes (those that are not qualifying outcomes) can be transmitted to the enterprise server 106 and the global server 140 at a later time.

Block 328 checks the game information to determine if it should be transmitted immediately to the enterprise server 106 and perhaps the global server 140 for storage in the enterprise and global databases 124 and 108. In the illustrated embodiment, game outcomes that are possible bonus outcomes are transmitted immediately to the enterprise server, as shown in blocks 328 and 330, while outcomes that are not qualifying outcomes are (optionally) cached and transmitted to the enterprise server 106 at a later time. This can happen periodically, or aperiodically. In one embodiment, the cached game information is transmitted if the cache is nearly full. In either case, as shown in block 335, the enterprise server 106 receives the came information.

In one embodiment of the invention, the enterprise server 106 stores the qualifying outcomes in the enterprise database 124 associably with the player ID, and makes a determination whether the stored qualifying outcomes meet the requirements for a bonus award. In another embodiment of the present invention, the enterprise server simply accepts the qualifying outcomes and transmits those qualifying outcomes and related information (including the player's ID) to the global server 140 for storage in the global database 108. In the illustrated embodiment, the enterprise server 106 checks the stored outcomes and, by comparing the stored outcomes with a bonus parameter set determines if the combination stored outcomes qualify for either a bonus or incrementing an existing bonus. If the stored outcomes qualify for a bonus or incrementing of a progressive bonus, the game play information (including the outcomes and potentially including handle and promotional earnings) is transmitted to the global controller 126 and thereafter transmitted to the global server 104 to be stored in the global database 108, as shown in blocks 338-344.

The global server 140, which has stored the game outcomes and other information received from the enterprise server 106 examines this information and determines whether a valid bonus promotional combination has been achieved. This is illustrated in block 346. If a valid result has been achieved, block 347 adds to the earned bonus to the player's individual account. Further, if a progressive bonus has been defined, it is incremented if indicated by the stored outcomes and progressive bonus parameter set. The individual player's information, including earned bonuses are then transmitted to the customer I/) device 202 via the global controller 126, enterprise server 106, and enterprise controller 204.

FIGS. 3A-3D illustrate operations used to exchange data between the enterprise 106 and global servers 140 and the customer I/O device 202. The operations required to enter game outcomes and be presented with earned bonuses is similar if the human interface is accomplished via a manual input terminal instead of an electronic gaming machine.

Figure 4:
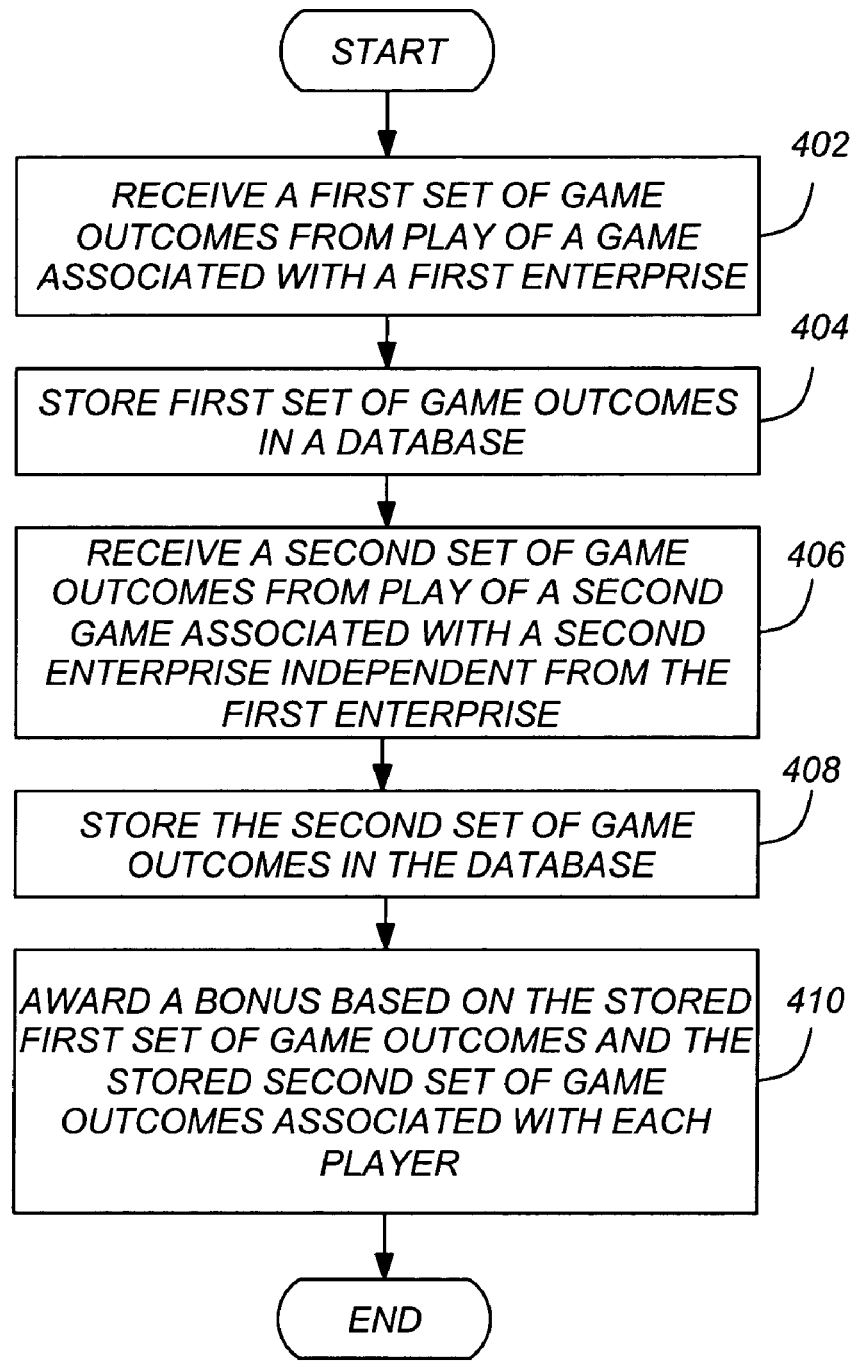
FIG. 4 is a flow chart illustrating exemplary operations used to practice one embodiment of the present invention.

FIG. 4 is a diagram illustrating exemplary operations used to practice one embodiment of the present invention. FIG. 4 is also discussed hereinafter with reference to FIG. 5 as well, which depicts pertinent aspect of the process of determining and awarding bonuses to customers.

A first set of game outcomes 508 is received, as shown in block 402. The first set of game outcomes are the result of play of a game with a first enterprise 102 are received as shown in block 402, and could include bonus-qualifying outcomes (game outcomes that at least partially qualify the customer for a bonus award or increment a progressive bonus) and non bonus-qualifying outcomes (which do not qualify the customer for a bonus award and do not cause a progressive bonus to be incremented). The first set of game outcomes are stored in a database. The database can be an enterprise associated only with the first enterprise 102, such as enterprise database 124 in the first enterprise server 106, or a global database 108. This is shown in block 404. A second set of game outcomes 510 from play of a second game associated with the second enterprise 104 is received, as shown in block 406. As described above, the second enterprise is an entity that is independent from and unrelated to the first enterprise 102. Next, the second set of game outcomes is stored in a database. The information can be stored in an enterprise database 128 in an enterprise server 138 separate from the first enterprise 102 and it's associated server 106 and database 124, or could be stored in the global database 108. A bonus is awarded based on the stored first set of game outcomes 508 and the second set of game outcomes 510 associated with the customer, as shown in block 410.

Figure 5:
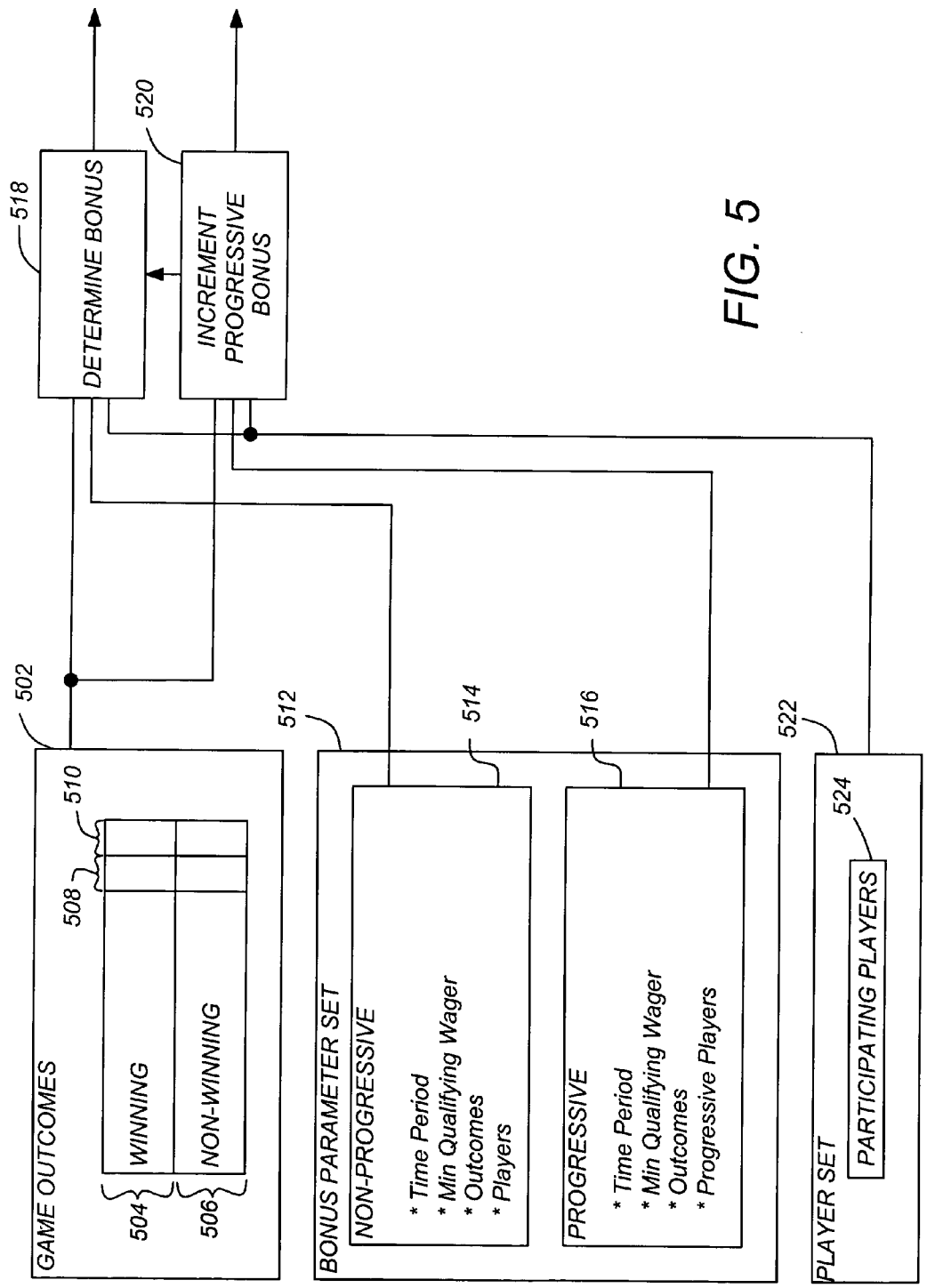
FIG. 5 is a diagram depicting pertinent aspects of the process of depicting and awarding bonuses to customers.

In one embodiment, the bonus awarded is determined by comparing the game outcome sets 508, 510 with a bonus parameter set 512. As shown in FIG. 5, the bonus parameter set can include a non-progressive bonus parameter set 514 and a progressive bonus parameter set 516. The non-progressive bonus parameter set defines bonus award requirements in terms of the data provided by the customer I/O devices 202 or the enterprise I/O devices 203, including the game outcomes and time period in which the outcomes in the first set of game outcomes 508 and the second set of game outcomes 510 (or those in sets 508 and 510 that are qualifying outcomes) occurred. Other parameters can be recorded and used to determine if the customer has earned a bonus or whether the progressive bonus should be incremented. For example, participation in a particular bonus program can require that the user provide a minimum qualifying wager amount. The present invention is particularly useful for implementing progressive bonus award systems, and even progressive bonus award systems that include a hierarchical arrangement of progressive bonuses. That is, the present invention allows the administrator to define a progressive bonus award based on the results of another bonus award (which may be itself be a progressive bonus). Further, the bonus award may be based on yet another bonus program. This allows the administrator virtually unlimited flexibility in setting up bonus structures to encourage game play and other consumer activity.

For example, a progressive bonus can be defined for a participating set of bonus group players in which a progressive bonus is incremented based upon the first set of game outcomes 508 associated with the participating set of bonus group players 524 and the progressive bonus parameter set 516.

Bonus award programs can be defined wherein the bonus is apportioned between participating players according to multiple bonus parameter sets, with qualification for some of the bonus award prizes being contingent on qualifying for another bonus award.

For example, the bonus parameter set can include a first bonus parameter set (which can include, for example, achieving two four-of-a-kind hands in succession) and a second bonus parameter set (which might include, for example, achieving one more four-of-a-kind hands within the next five hands played). A first progressive bonus jackpot A) and a second progressive bonus jackpot B) can be defined as beginning at $1,000 and $10,000 respectively. Jackpot A and jackpot B can also be defined to be incremented in value by an amount each time a registered player achieves four-of-a-kind on a participating gaming machine. As game play commences, jackpot A and jackpot B will increment and become larger and larger (either jackpot or both may be limited to a maximum value as well). If a player achieves two successive four-of-a-kind hands, that player is awarded jackpot A. Jackpot A resets to the base value ($1,000) and is again incremented as game play continues and more game outcomes of four-of-a-kind are recorded. If the same player achieves another four-of-a-kind hand within the next five hands, the player is awarded jackpot B (which includes the base value of $10,000 and has been incremented each time a participating player achieved four-of-a-kind).

A similar promotion can be defined using reel slot machines. For example, two jackpots can be defined with base credit values of $1000 (Jackpot A) and $10,000 (Jackpot B). The progressive bonus parameter set can be set such that each jackpot increments by $0.10 each time that a particular result (e.g. a jackpot symbol) is achieved by a registered player on a participating slot machine with a bet of $1.25 or more, and such that the jackpot is awarded to the first participating player to achieve two reel stops showing at least two jackpot symbols in succession. Further, the progressive bonus parameter set for jackpot B can be set such that the jackpot increments by $0.10 each time the jackpot symbol is achieved by a registered player, and such that the jackpot is awarded to the first participating player to achieve two real stops showing at least two jackpot symbols in succession and then achieving at least two jackpot symbols within the next three minutes. Therefore, if player A registers as a participating player and player A achieves two successive reel stops with at least two jackpot symbols, a bonus award in the form of one or more credits reflecting the value of jackpot A are written to the player's account for redemption at the customer's convenience at a REM 210. Jackpot A then resets to the base value of $1,000 and begins incrementing each time a registered player achieves a result defined in the progressive bonus parameter set. If a player achieves two successive reel stops showing at least two jackpot symbols (thus winning Jackpot A) and goes on to achieve a reel stop with at least two jackpot symbols within the next three minutes, that player is awarded Jackpot B. After this, jackpot B resets to the base value of $10,000, and progressive bonus play begins anew.

In addition to defining bonus award programs wherein the bonus award is apportioned between participating players according to multiple bonus parameter sets, it is possible to define progressive and non-progressive bonus award programs hierarchically so that qualification for some of the bonus award prizes being contingent on qualifying for another bonus award. For example, using the present invention it is possible to define a layered promotional program which provides and tracks bonuses to players who achieve a four-of-a-kind hand, a second promotion which provides and tracks players who achieved given number four-of-a-kind hands within a specific time period, and a third promotion based on the second promotion, wherein each of the players achieving the given number of four-of-a-kind hands within the specified time period are entered into a drawing to win a new automobile.

It is also possible to define promotions in which additional jackpots are spawned under certain circumstances, including for example, when a jackpot has reached it's maximum award. Such jackpots can be awarded to a subset of the participating progressive bonus players (i.e., players that whose game outcomes match an appropriate award bonus parameter set).

For example, consider a promotional bonus program defined as described below:

First Bonus Parameter Set: A qualifying outcome requirement of achieving three four-of-a-kind hands in a row within a 24 hour period First Progressive Bonus (Jackpot A): $1,000 base; increments $0.25 each time an increment-qualifying outcome of a four-of-a-kind hand is reached; $25,000 maximum Second Bonus Parameter Set: A qualifying outcome requirement of achieving at least two four of a kind hands in a row within the 24 hour period.

Second Progressive Bonus (Jackpot B): Spawned when the first progressive bonus (Jackpot A) reaches it's maximum ($25,000); $10,000 base value; increments $0.25 each time an increment-qualifying outcome of a four-of-a-kind hand is achieved; no maximum.

In this promotional bonus program, a first jackpot (Jackpot A) with a base value of $1000 is defined. The value of Jackpot A increases $0.25 each time an increment qualifying outcome is reached (e.g. a registered player achieves a four-of-a-kind hand. The maximum value of Jackpot A is set at $25,000. After Jackpot A reaches the maximum value, Jackpot B is spawned and funded with a base value of $10,000. This value is then incremented $0.25 for each four-of-a-kind hand achieved by registered player on a registered gaming machine.

When player's game play outcomes match the first jackpot qualifying outcome requirement of achieving three four-of-a-kind hands in a row within a 24 hour period, that player is awarded the first progressive jackpot of $25,000. The second progressive jackpot is then awarded to a set of players if the game play outcomes for each of the set of players match the second qualifying outcome requirement, in this case, the group of participating players on participating machines that managed to get at least two four-of-a-kind hands within the preceding two hours.

This promotional bonus program encourages play, by providing a large bonus that can be shared by a large number of people. For example, after a period of time, Jackpot A will remain at $25,000, but Jackpot B may continue to grow until it reaches perhaps $200,000. Depending on the second qualifying outcome requirement, and the incremented value of the second progressive jackpot, each player's share of the second progressive jackpot could easily exceed the player's winnings from the first jackpot.

Using data stored by the CPBS 100, other bases can be used to select the members of the group that will share the second progressive jackpot, including handle, hands played, or other measures. For example, Jackpot B can be divided among the top 100 participating players based on their registered coin-in activity over a preceding time period of 48 hours. If desired, Jackpot B can be divided among all of the players that are participating at the time that the player achieves the first jackpot qualifying outcome of three four-of-a-kind hands in a row.

Figure 6:
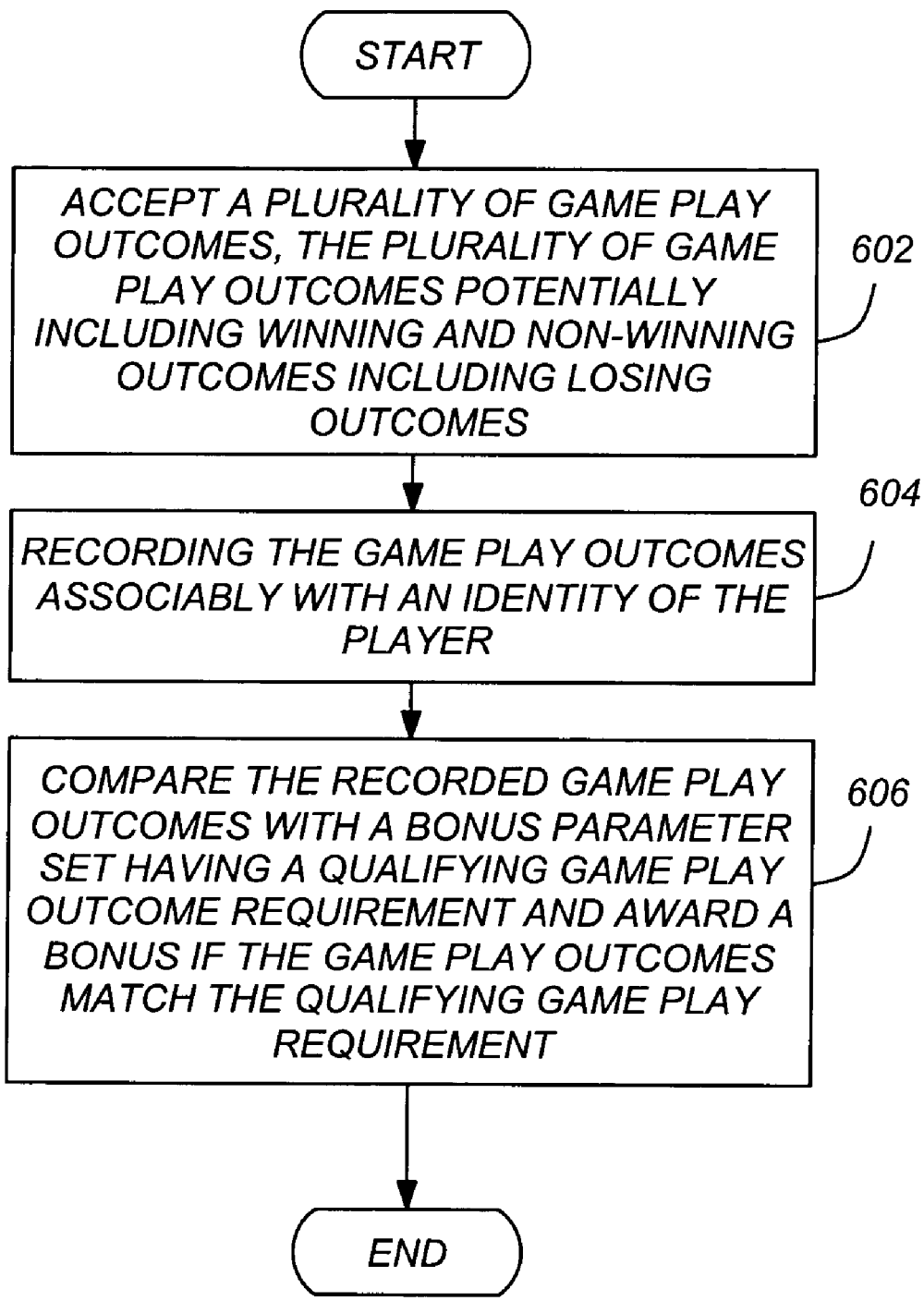
FIG. 6 is a flow chart illustrating another embodiment of a promotional bonus program that can be implemented with the customizable player bonus system.

FIG. 6 is a diagram illustrating another embodiment of a promotional bonus program that can be implemented with the CPBS 100. A plurality of game outcomes are accepted, as shown in block 602. The game outcomes potentially include a set or plurality of winning outcomes 604 and a set or plurality of non-winning outcomes 606 such as losing outcomes and draws. This is shown in block 602. Game play outcomes (and other information if desired) are recorded associably with an identity of the player, as shown in block 604. The game play outcomes are compared with a bonus parameter set having a qualifying game play outcome requirement, and an bonus is awarded if the game play outcomes match the qualifying game play requirement, as shown in block 606.

The qualifying game play outcome may be a combination of game play outcomes, including a particular sequence of game play outcomes (e.g. two four-of-a-kind hands in a row). The sequence of game play outcomes may be defined to include, for example, any particular series of card combinations in any particular order, and can be based on both winning and non-winning outcomes. For example, one card short of a straight or a straight flush may be used as a qualifying game play outcome. Further, qualifying game play outcomes may include intermediary outcomes.

As described above, the bonus program can include one or more progressive jackpots that are incremented according to increment-qualifying game play outcomes. Bonuses are awarded if the game play outcomes match the qualifying combination of game play outcomes by awarding the first progressive jackpot to a player if the player's recorded game play outcomes match a first jackpot qualifying combination. Further, as described above, a first progressive jackpot and a second progressive jackpot can be defined in which the second progressive jackpot is spawned when the first progressive jackpot reaches a maximum value. A player is awarded the first progressive bonus after achieving a first progressive jackpot qualifying outcome, and the second, spawned jackpot is shared among qualified players according to other requirements such as handle, total games played, or game play outcomes.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of tracking play of a game, comprising the steps of:
   receiving a first set of game outcomes from play of a game associated with a first enterprise, wherein the first set of game outcomes include final game outcomes and intermediary game outcomes;
   storing the first set of game outcomes in a database maintained by an enterprise organizationally distinct from the first enterprise and the second enterprise;
   receiving a second set of game outcomes from play of a second game associated with a second enterprise independent from the first enterprise, wherein the second set of game outcomes includes final game outcomes and intermediary game outcomes; and
   storing the second set of game outcomes in the database and
   awarding a progressive bonus that is incremented based upon the stored first set of game outcomes associated with a set of participating progressive bonus players and the stored second set of game outcomes associated with the set of participating progressive bonus players, and a progressive bonus parameter set;
   wherein the progressive bonus parameter set includes a time period in which the outcomes in the first set of game outcomes occurred and the outcomes in the second set of game outcomes occurred.

2. The method of claim 1, wherein the first set of game outcomes is stored in the database associably with an identity of a player of the game and the second set of game outcomes is stored in the database as sociably with a player of the second game.

3. The method of claim 1, further comprising the step of: awarding a bonus based on the stored first set of game outcomes and the stored second set of game outcomes associated with a player.

4. The method of claim 1, wherein the progressive bonus parameter set includes:
   a minimum qualifying wager.

5. The method of claim 1, further comprising the steps of:
   qualifying players selected from the set of participating progressive bonus players for a second bonus based upon the first set of game outcomes and the second set of game outcomes and a second bonus qualifying parameter set; and
   awarding a second bonus to at least one of the qualified players based upon the first set of game outcomes and the second set of game outcomes and a second bonus parameter set.

6. The method of claim 1, wherein:
   the first set of game outcomes and the second set of game outcomes comprise winning outcomes and losing outcomes; and
   the stored first set of game outcomes and the stored second set of game outcomes include the winning outcomes and losing outcomes.

7. The method of claim 1, wherein the game is a live table game.

8. The method of claim 7, wherein the step of receiving the set of game outcomes from play of the game comprises the steps of:
   reading a player identification device; and
   manually entering the first set of game play outcomes in a device communicably coupleable with the database.

9. A method of tracking play of a game, comprising the steps of:
   receiving a first set of game outcomes from play of a game associated with a first enterprise, wherein the first set of game outcomes include final game outcomes and intermediary game outcomes;
   storing the first set of game outcomes in a database;
   receiving a second set of game outcomes from play of a second game associated with a second enterprise independent from the first enterprise, wherein the second set of game outcomes include final game outcomes and intermediary game outcomes; and
   storing the second set of game outcomes in the database and
   awarding a progressive bonus that is incremented based upon the stored first set of game outcomes associated with a set of participating progressive bonus players and the stored second set of game outcomes associated with the set of participating progressive bonus players, and a progressive bonus parameter set;
   wherein the progressive bonus parameter set includes a time period in which the outcomes in the first set of game outcomes occurred and the outcomes in the second set of game outcomes occurred and further includes a first award bonus parameter set and a second award bonus parameter set;
   a first portion of said progressive bonus is awarded to one of the participating players based upon the stored first set of game outcomes associated with the one of the participating players and the stored second set of game outcomes associated with the one of the participating players and a first award bonus parameter set; and
   a second portion of said progressive bonus is awarded to a subset of the set of participating progressive bonus players based upon the stored first set of game outcomes associated with a subset of the set of participating bonus players and the stored second set of game outcomes associated with the subset of the set of participating bonus players and a second award bonus parameter set.

10. The method of claim 9, wherein the second portion is the remaining portion of the progressive bonus.

11. The method of claim 10, wherein:
    the first award bonus parameter set includes a first qualifying outcome;
    the second award bonus parameter set includes a second qualifying outcome;
    wherein the first game and the second game are poker games and the outcomes are poker hands;
    the first qualifying outcome is a first number of qualifying poker hands; and
    the second qualifying outcome is a second number of qualifying poker hands.

12. A method of providing an award based on play of a game, comprising the steps of:
    accepting a plurality of game play outcomes, the plurality of game play outcomes comprising final outcomes, intermediary outcomes, winning outcomes and non-winning outcomes including losing outcomes;
    recording the game play outcomes associably with an identity of the player, wherein the recorded game play outcomes include non-winning outcomes and intermediary outcomes;
    comparing the recorded game play outcomes with a bonus parameter set having a qualifying game play outcome requirement and awarding a bonus if the game play outcomes match the qualifying game play outcome requirement, and wherein the bonus is computed at least in part based on the recorded non-winning outcomes wherein the bonus is computed at least in part on the recorded intermediary outcomes and said game play outcomes include at least one increment-qualifying outcome;

said game includes a first progressive jackpot incremented for each increment-qualifying outcome; and said game includes a second progressive jackpot incremented for each increment- qualifying outcome; and the step of awarding a bonus if the game play outcomes match the qualifying combination of game play outcomes comprises the step of awarding the first progressive jackpot to a first player if the first player's recorded game play outcomes match a first progressive jackpot qualifying combination;

the step of awarding a bonus if the game play outcomes match the qualifying combination of game play outcomes comprises the step of awarding the second progressive jackpot to a second player if the second player's recorded game play outcomes match a second progressive jackpot qualifying combination.

13. The method of claim 12, wherein the bonus is awarded if the game play outcomes match the qualifying game play outcome requirement within a qualifying time period.

14. The method of claim 13, wherein the qualifying game play outcome requirement is a combination of game play outcomes.

15. The method of claim 14, wherein the combination of game play outcomes includes a sequence of game play outcomes.

16. The method of claim 15, wherein the sequence of game play outcomes includes wildcard game play outcomes.

17. The method of claim 14, wherein:

the game play outcomes comprise final outcomes including winning outcomes and losing outcomes;

the recorded subset of the plurality of game play outcomes included losing outcomes; and the bonus is computed at least in part on the recorded losing outcomes.

18. The method of claim 12, wherein the increment qualifying outcome is a pre-specified final outcome.

19. The method of claim 12, wherein:

the game play outcomes include at least one increment-qualifying outcome;

the bonus comprises a first progressive jackpot and a second progressive jackpot;

the method further comprises the steps of:

incrementing said first progressive jackpot for each increment-qualifying outcome until said first progressive jackpot achieves a first progressive jackpot maximum;

after said first progressive jackpot achieves the first progressive jackpot maximum, incrementing said second progressive jackpot for each qualifying outcome; and the steps of comparing the recorded game play outcomes with a bonus parameter set having a qualifying game play outcome requirement and awarding bonus if the game play outcomes match the qualifying game play outcome requirement comprises the step of:

when a first player's game play outcomes match a first progressive jackpot qualifying outcome requirement, awarding said first progressive jackpot to the first player and awarding said second progressive jackpot to a set of players if the game play outcomes for each of the set of players match a second progressive jackpot qualifying outcome requirement.

20. The method of claim 12, wherein the game is implemented in a gaming device and the step of recording the game play outcomes associably with an identity of the player comprises the step of:

storing a player identifier and the game play outcomes in a memory communicatively coupled to the gaming device.

21. The method of claim 12, wherein the game play outcomes are outcomes of a live table game.

22. The method of claim 12, wherein the step of accepting a plurality of game play outcomes comprises the steps of:

reading a player identification device; and manually entering at least a portion of the plurality game play outcomes in a device communicably coupleable with the database.

23. An apparatus for tracking play of a game, comprising:

means for receiving a first set of game outcomes from play of a game associated with a first enterprise, wherein the first set of game outcomes includes final game outcomes and intermediary game outcomes;

means for storing the first set of game outcomes in a database maintained by an enterprise organizationally distinct from the first enterprise and the second enterprise;

means for receiving a second set of game outcomes from play of a second game associated with a second enterprise independent from the first enterprise, wherein the second set of game outcomes includes final game outcomes and intermediary game outcomes; and means for storing the second set of game outcomes in the database and means for awarding a progressive bonus that is incremented based upon the stored first set of game outcomes associated with a set of participating progressive bonus players and the stored second set of game outcomes associated with the set of participating progressive bonus players, and a progressive bonus parameter set;

wherein the progressive bonus parameter set includes a time period in which the outcomes in the first set of game outcomes occurred and the outcomes in the second set of game outcomes occurred.

24. The apparatus of claim 23, wherein the first set of game outcomes is stored in the database associably with an identity of a player of the game and the second set of game outcomes is stored in the database as sociably with a player of the second game.

25. The apparatus of claim 23, further comprising:

means for awarding a bonus based on the stored first set of game outcomes and the stored second set of game outcomes associated with a player.

26. The apparatus of claim 23 wherein the progressive bonus parameter set includes:

a minimum qualifying wager.

27. The apparatus of claim 23, further comprising:

means for qualifying players selected from the set of participating progressive bonus players for a second bonus based upon the first set of game outcomes and the second set of game outcomes and a second bonus qualifying parameter set; and means for awarding a second bonus to at least one of the qualified players based upon the first set of game outcomes and the second set of game outcomes and a second bonus parameter set.

28. The apparatus of claim 23, wherein:
the first set of game outcomes and the second set of game outcomes comprise winning outcomes and losing outcomes; and
the stored first set of game outcomes and the stored second set of game outcomes include the winning outcomes and losing outcomes.

29. The apparatus of claim 23, wherein the game is a live table game.

30. The apparatus of claim 29, wherein the means for receiving the set of game outcomes from play of the game comprises:
means for reading a player identification device; and
means for manually entering the first set of game play outcomes in a device communicably coupleable with the database.

31. An apparatus for tracking play of a game, comprising:
means for receiving a first set of game outcomes from play of a game associated with a first enterprise, wherein the first set of game outcomes include final game outcomes and intermediary game outcomes;
means for storing the first set of game outcomes in a database;
means for receiving a second set of game outcomes from play of a second game associated with a second enterprise independent from the first enterprise, wherein the second set of game outcomes includes final game outcomes and intermediary game outcomes; and
means for storing the second set of game outcomes in the database and
means for awarding a progressive bonus that is incremented based upon the stored first set of game outcomes associated with a set of participating progressive bonus players and the stored second set of game outcomes associated with the set of participating progressive bonus players, and a progressive bonus parameter set;
wherein the progressive bonus parameter set includes a time period in which the outcomes in the first set of game outcomes occurred and the outcomes in the second set of game outcomes occurred and further includes a first award bonus parameter set and a second award bonus parameter set;
a first portion of said progressive bonus is awarded to one of the participating players based upon the stored first set of game outcomes associated with the one of the participating players and the stored second set of game outcomes associated with the one of the participating players and a first award bonus parameter set; and
a second portion of said progressive bonus is awarded to a subset of the set of participating progressive bonus players based upon the stored first set of game outcomes associated with a subset of the set of participating bonus players and the stored second set of game outcomes associated with the subset of the set of participating bonus players and a second award bonus parameter set.

32. The apparatus of claim 31, wherein the second portion is the remaining portion of the progressive bonus.

33. The apparatus of claim 32, wherein:
the first award bonus parameter set includes a first qualifying outcome;
the second award bonus parameter set includes a second qualifying outcome;
wherein the first game and the second game are poker games and the outcomes are poker hands;
the first qualifying outcome is a first number of qualifying poker hands; and
the second qualifying outcome is a second number of qualifying poker hands.

34. An apparatus for providing an award based on play of a game, comprising:
means for accepting a plurality of game play outcomes, the plurality of game play outcomes comprising final outcomes, intermediary outcomes, winning outcomes and non-winning outcomes including losing outcomes;
means for recording the game play outcomes associably with an identity of the player, wherein the recorded game play outcomes include non-winning outcomes and intermediary outcomes;
means for comparing the recorded game play outcomes with a bonus parameter set having a qualifying game play outcome requirement and awarding a bonus if the game play outcomes match the qualifying game play outcome requirement, and wherein the bonus is computed at least in part based on the recorded non-winning outcomes wherein
said bonus is computed at least in part on the recorded intermediary outcomes
the game play outcomes include at least one increment-qualifying outcome;
said game includes a first progressive jackpot incremented for each increment-qualifying outcome; and said game includes a second progressive jackpot incremented for each increment-qualifying outcome; and
said means for awarding a bonus if the game play outcomes match the qualifying combination of game play outcomes comprises means for awarding said first progressive jackpot to a first player if the first player's recorded game play outcomes match a first progressive jackpot qualifying combination;
said means for awarding a bonus if the game play outcomes match the qualifying combination of game play outcomes comprises means for awarding said second progressive jackpot to a second player if the second player's recorded game play outcomes match a second progressive jackpot qualifying combination.

35. The apparatus of claim 34, wherein the bonus is awarded if the game play outcomes match the qualifying game play outcome requirement within a qualifying time period.

36. The apparatus of claim 35, wherein the qualifying game play outcome requirement is a combination of game play outcomes.

37. The apparatus of claim 36, wherein the combination of game play outcomes includes a sequence of game play outcomes.

38. The apparatus of claim 37, wherein the sequence of game play outcomes includes wildcard game play outcomes.

39. The apparatus of claim 36, wherein:
the game play outcomes comprise final outcomes including winning outcomes and losing outcomes;
the recorded subset of the plurality of game play outcomes includes losing outcomes; and
the bonus is computed at least in part on the recorded losing outcomes.

40. The apparatus of claim 34, wherein the increment qualifying outcome is a pre-specified final outcome.

41. The apparatus of claim 34, wherein:
the game play outcomes include at least one increment-qualifying outcome;
said bonus comprises said first progressive jackpot and said a-second progressive jackpot;
the apparatus further comprising:

means for incrementing said first progressive jackpot for each increment-qualifying outcome until said first progressive jackpot achieves a first progressive jackpot maximum;

means for incrementing said second progressive jackpot for each qualifying outcome after said first progressive jackpot achieves the first progressive jackpot maximum; and said means for comparing the recorded game play outcomes with a bonus parameter set having a qualifying game play outcome requirement and awarding bonus if the game play outcomes match the qualifying game play outcome requirement comprises:

means for awarding said first progressive jackpot to the first player and awarding said second progressive jackpot to a set of players when a first player's game play outcomes match a first progressive jackpot qualifying outcome requirement, if the game play outcomes for each of the set of players match a second progressive jackpot qualifying outcome requirement.

42. The apparatus of claim 34, wherein the game is implemented in a gaming device and the means for recording the game play outcomes associably with an identity of the player comprises:

means for storing a player identifier and the game play outcomes in a memory communicatively coupled to the gaming device.

43. The apparatus of claim 34, wherein the game play outcomes are outcomes of a live table game.

44. The apparatus of claim 34, wherein the means for accepting a plurality of game play outcomes comprises:

means for reading a player identification device; and means for manually entering at least a portion of the plurality game play outcomes in a device communicably coupleable with the database.

* * * * *

UNITED STATES PATENT AND TRADEMARK OFFICE
CERTIFICATE OF CORRECTION

| | | |
|---|---|---|
| PATENT NO. | : 7,766,744 B2 | Page 1 of 1 |
| APPLICATION NO. | : 10/663950 | |
| DATED | : August 3, 2010 | |
| INVENTOR(S) | : de Waal et al. | |

It is certified that error appears in the above-identified patent and that said Letters Patent is hereby corrected as shown below:

TITLE PAGE:

Item (56), on page 1, entitled "References Cited", change the following: "Hatam-Tabrizi et al." to --Hatam-Tabrizi--.

Item (56), on page 2, entitled "References Cited", change the following: "Fertitta et al." to --Fertitta, III et al.--.

SPECIFICATION:

Column 8, line 39, "came" should read --game--.

Column 9, line 36, "it's" should read --its--.

Column 11, line 15, "it's" should read --its--.

Column 11, line 32, "it's" should read --its--.

CLAIMS:

In line 4 of claim 2 (column 13, line 31) "as sociably" should read --associably--.

In line 4 of claim 24 (column 16, line 46) "as sociably" should read --associably--.

Signed and Sealed this
Twenty-first Day of June, 2011

David J. Kappos
*Director of the United States Patent and Trademark Office*